Nov. 20, 1928.  
M. G. DE RUEDA  
1,692,290  
PUMP AND LIKE ENGINE  
Filed July 13, 1927
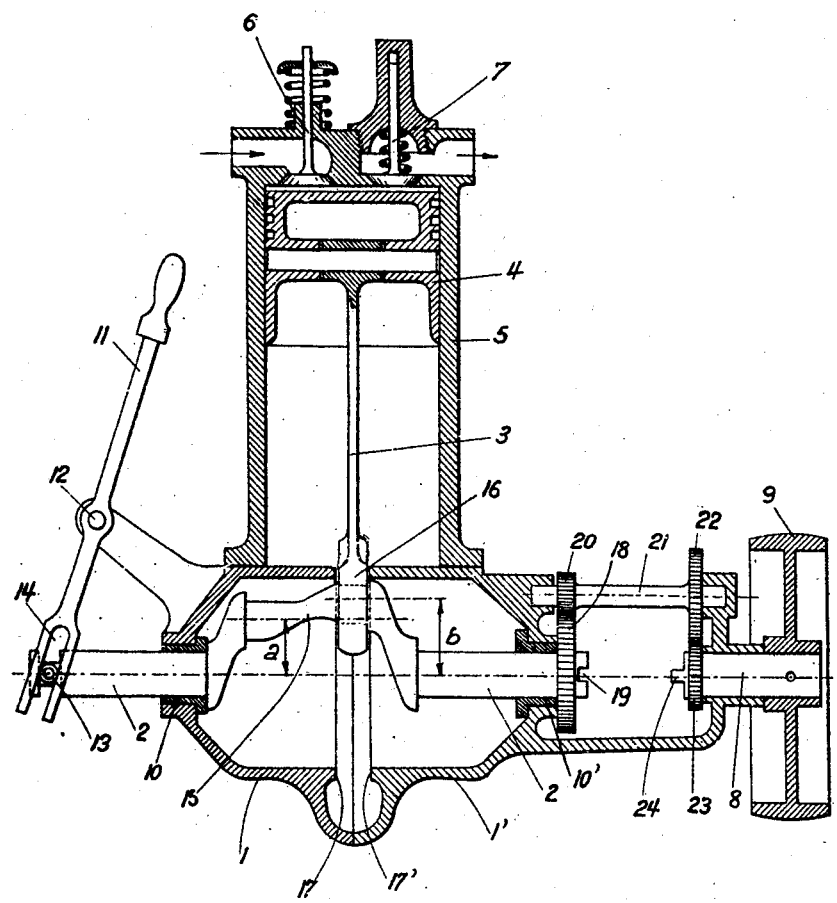

Patented Nov. 20, 1928.

1,692,290

UNITED STATES PATENT OFFICE.

MANUEL GÓMEZ DE RUEDA, OF PARIS, FRANCE.

PUMP AND LIKE ENGINE.

Application filed July 13, 1927. Serial No. 205,304.

Pumps now in use are generally made for well-determined operating conditions and if these conditions have to be modified it is also necessary to modify the characteristics of the pump, particularly the speed of rotation, the stroke and the volumetric ratio.

The main object of the present invention is to provide a pump in which the speed of rotation of its shaft and the radius of gyration of its crank pin or pins can be modified simultaneously by one operation, without disassembling of parts or change in the control or drive of the pump.

The annexed drawing represents, by way of example, a sectional view of one form of construction of the invention applied to a piston pump driven by a pulley. Two conditions of working are allowed for in this example: the one with a speed of rotation of the crank-shaft equal to that of the driving pulley, with reduced stroke and volumetric ratio and the other with a speed of rotation of the crank-shaft less than that of the driving pulley, with increased stroke and volumetric ratio.

In this example 1, 1' are the two assembled parts forming the crank case. 2 is the crank shaft, 3 the connecting rod, 4 the piston, 5 the cylinder, 6 the suction valve and 7 the discharge valve; 8 is the control shaft carrying the driving pulley 9.

The crank shaft 2 is arranged so as to be able to slide longitudinally in its bearings 10, 10', which movement can be produced by the lever 11 pivoting on the shaft 12 carried by casing 1 and provided with rollers 13 engaging in the circular groove 14 of the shaft 2. The crank pin 15 of the said shaft is stepped in such a way that it presents at one end a cylindrical part with radius of gyration $a$, at the other end a similar part, but with a radius of gyration $b$, whilst the intermediary part has a suitable shape for enabling the end 16 of the connecting rod 3 to pass from one end of the crank pin 15 to the other during the sliding of the shaft. In order to avoid all jamming in this operation the end 16 of the connecting rod is guided with a slight play between the edges 17, 17' of the parts of the gear case 1, 1'. The shaft 2 has on the pulley side a toothed pinion 18 and a groove 19.

In the position shown the pinion 18 is in engagement with a pinion 20 on the layshaft 21, the pinion 22 of which engages with the pinion 23 rigid with the shaft 8: This is the position corresponding to a speed of the shaft 2 reduced in proportion to the speed of the pulley and with maximum stroke and volumetric ratio.

On actuating the upper end of lever 11 towards the left-hand side the shaft 2 is displaced towards the right, forcing the connecting rod to pass over the crank pin whilst the pinion 18 leaves the pinion 20 and at the end of the travel the groove 19 is thrown into engagement with the tenon 24 on the shaft 8: The intermediary shaft 21 turns idly and the pump operates then with a speed of shaft 2 equal to the speed of the pulley, whilst its stroke and its volumetric ratio are reduced.

It is to be understood that the form of construction represented and described above is only by way of example and the application of the invention can be given a number of variations without exceeding the scope thereof.

What I claim is:—

1. In a crank driven engine the combination of a crank with means for simultaneously varying both the speed and the effective radius of said crank.

2. In a crank driven engine in combination a crank operated shaft, means for driving said shaft at different speeds and adjusting means for varying the effective radius of the crank of said shaft in setting said shaft to be driven at the required speed.

3. In combination a crank driven pump and means for varying the speed of said crank shaft and operative radius of said crank simultaneously.

4. In a pump in combination a cylinder and associated valves, a piston reciprocable within said cylinder, a stepped crank driving said piston through a connecting rod, means for altering the position of said connecting-rod relatively to the steps of the crank and means for simultaneously changing the speed ratio of the means driving said crank.

5. In a pump, a cylinder with associated valves, a piston adapted to reciprocate within said cylinder, a driving crank shaft having a plurality of portions at right angles to the axis of the cylinder connected by inclined portions, a connecting rod between said crank and piston, and means for altering the relative positions of said connecting rod and said right angle portions of the crank shaft.

6. In a pump, a crank case, a stepped crank shaft slidable endwise therein, two sets of driving gear adapted to make alternate engagement with said crank shaft, and means for bringing said crank shaft into engagement with one or the other of said driving sets at will.

In testimony whereof I hereto set my hand.

MANUEL GÓMEZ DE RUEDA.